(12) United States Patent
Hishida et al.

(10) Patent No.: US 7,586,223 B2
(45) Date of Patent: Sep. 8, 2009

(54) ULTRA-THIN SPINDLE MOTOR HAVING GROOVE FORMED ON THE OUTER CIRCUMFERENTIAL SURFACE OF THRUST BEARING

(75) Inventors: Noriaki Hishida, 123-1 Goji-ri, Jeongnam-myeon, Hwaseong-Si, Gyeonggi-Do, 445-962 (KR); Kook Hyeun Yang, Suwon-Si (KR)

(73) Assignees: A-Tech Solution Co., Ltd., Gyeonggi-do (KR); Noriaki Hishida, Gyeonggi-do (KR)

( * ) Notice: Subject to any disclaimer, the term of this patent is extended or adjusted under 35 U.S.C. 154(b) by 257 days.

(21) Appl. No.: 11/885,257

(22) PCT Filed: Aug. 30, 2005

(86) PCT No.: PCT/KR2005/002860

§ 371 (c)(1),
(2), (4) Date: Aug. 29, 2007

(87) PCT Pub. No.: WO2006/112575

PCT Pub. Date: Oct. 26, 2006

(65) Prior Publication Data

US 2008/0157617 A1 Jul. 3, 2008

(30) Foreign Application Priority Data

Apr. 19, 2005 (KR) .................. 10-2005-0032371

(51) Int. Cl.
H02K 5/16 (2006.01)
G11B 19/20 (2006.01)
F16C 32/06 (2006.01)

(52) U.S. Cl. .............. 310/67 R; 310/90; 360/99.08; 384/107

(58) Field of Classification Search .......... 310/67 R, 310/90; 360/98.07, 99.08; 384/100, 107, 384/110, 121–124, 132, 19.028, 19.029
See application file for complete search history.

(56) References Cited

U.S. PATENT DOCUMENTS 5,160,866 A * 11/1992 Hishida et al. ............ 310/90

(Continued)

FOREIGN PATENT DOCUMENTS

JP 08098460 A * 4/1996
JP 2001268844 A * 9/2001

*Primary Examiner*—Tran N Nguyen
(74) *Attorney, Agent, or Firm*—Rosenberg, Klein & Lee

(57) ABSTRACT

An ultra-thin spindle motor having a groove formed on the outer circumferential surface of a thrust bearing is disclosed. The present invention relates to an ultra-thin spindle motor among small-sized motor using a hydro dynamic pressure generating bearing and its object is to provide a spindle motor capable of stably driving without requiring a sleeve that was required to support a shaft in a radial direction in which a thrust bearing sleeve for coupling a hub and a thrust bearing is constructed and a radial hydro dynamic pressure generating groove is formed on the outer circumferential surface to thereby allow a radial hydro dynamic pressure to be generated and support a thrust bearing sleeve coupled integrally to the hub. Accordingly, the ultra-thin spindle motor having a groove formed on the outer diameter of a thrust bearing which uses a hydro dynamic bearing according to the present invention has a structure doing not need a sleeve to support the shaft, and fabricates a groove on the outer circumferential surface of the thrust bearing to thereby overcome structural thickness in manufacturing the spindle motor, compared to conventional spindle motors having a structural problems that need a sleeve to support the shaft by generating a radial dynamic pressure and have a limitation in shortening the length of shaft to form a radial dynamic pressure generating groove, and can comply with the requirements for main properties required in the spindle motor for HDD such as a low non repeatable run out (low NRRO), low noise, high speed rotation, high intensity, low power consumption, high confidence, a small size, low dust, low cost and the like.

10 Claims, 8 Drawing Sheets

U.S. PATENT DOCUMENTS

| | | | |
|---|---|---|---|
| 5,559,382 A * | 9/1996 | Oku et al. ..................... 310/90 |
| 5,653,540 A | 8/1997 | Heine et al. |
| 6,121,703 A * | 9/2000 | Kloeppel et al. .............. 310/90 |
| 6,592,262 B2 | 7/2003 | Rahman |
| 6,619,848 B2 | 9/2003 | Ishikawa et al. |
| 6,746,151 B2 | 6/2004 | Le et al. |
| 6,921,996 B2 * | 7/2005 | Parsoneault et al. ........... 310/90 |
| 6,949,852 B2 * | 9/2005 | Aiello ......................... 310/90 |
| 2004/0179294 A1 * | 9/2004 | Asada et al. ............. 360/99.08 |

* cited by examiner

[Fig. 1]
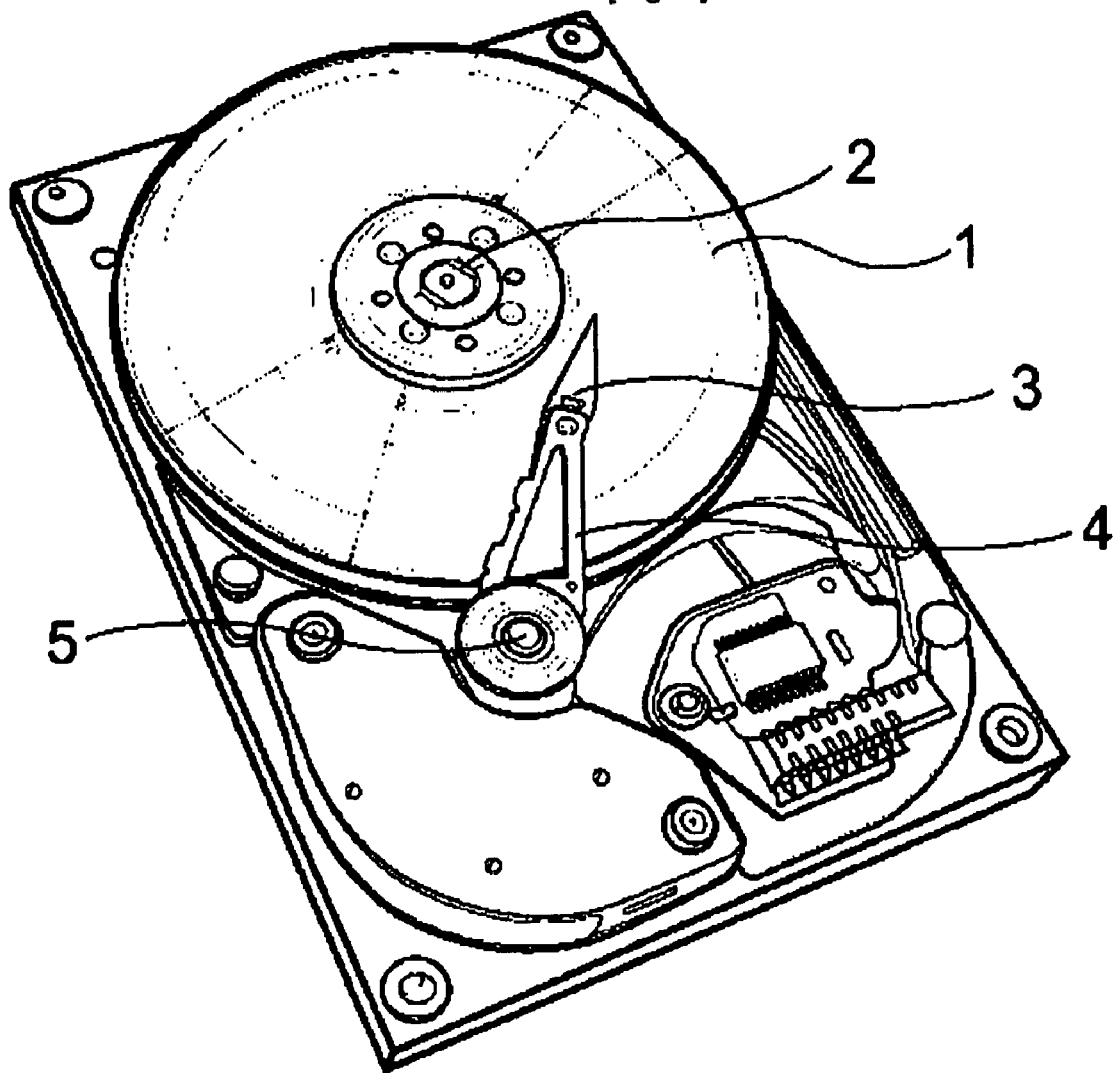
[Fig. 2]
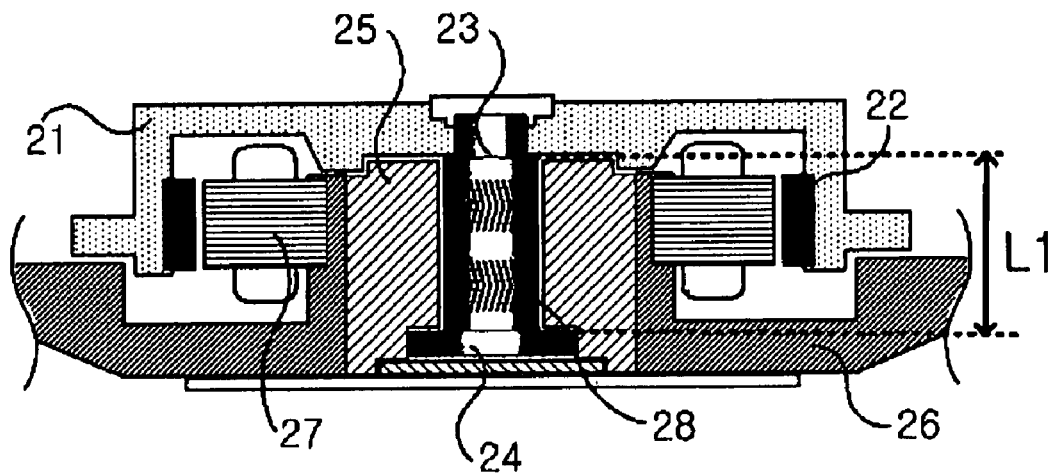

[Fig. 3]
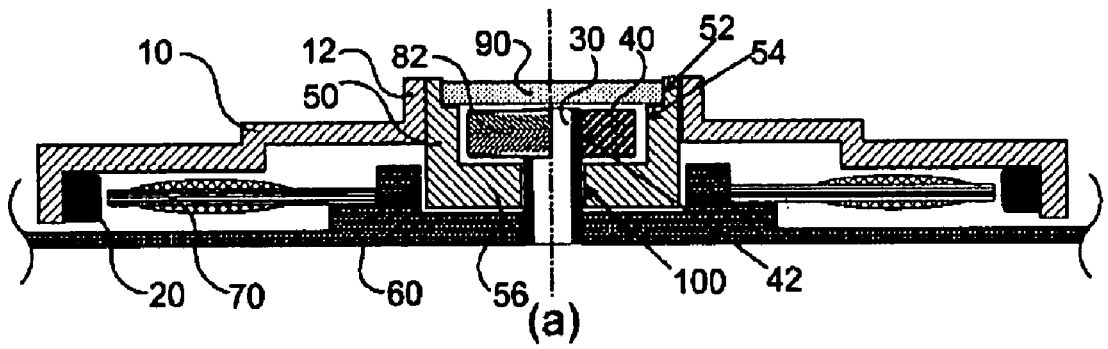
(a)
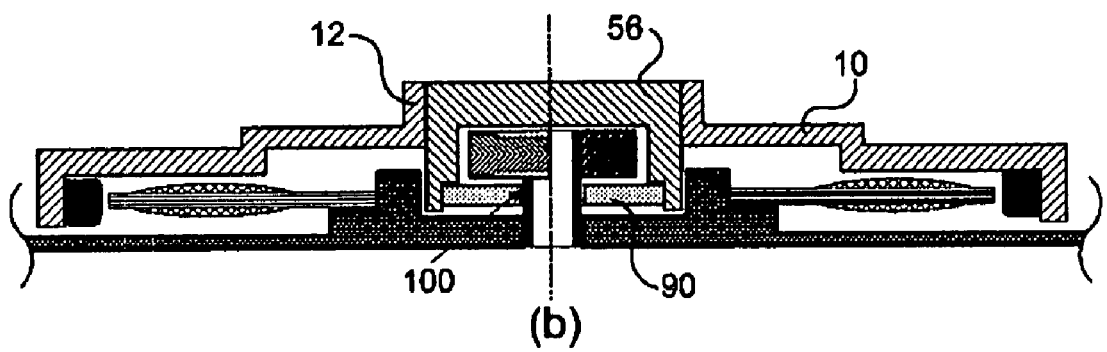
(b)
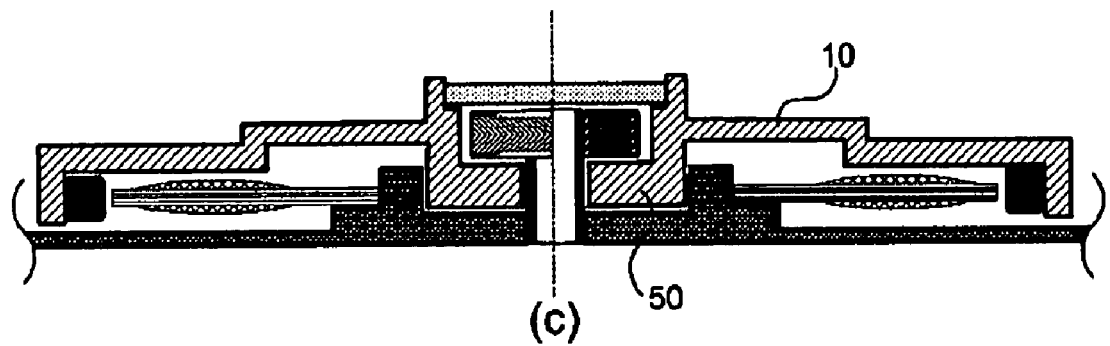
(c)
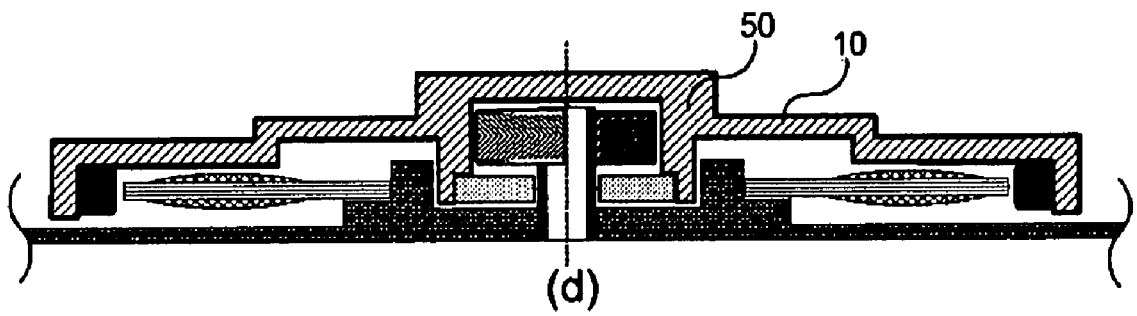
(d)

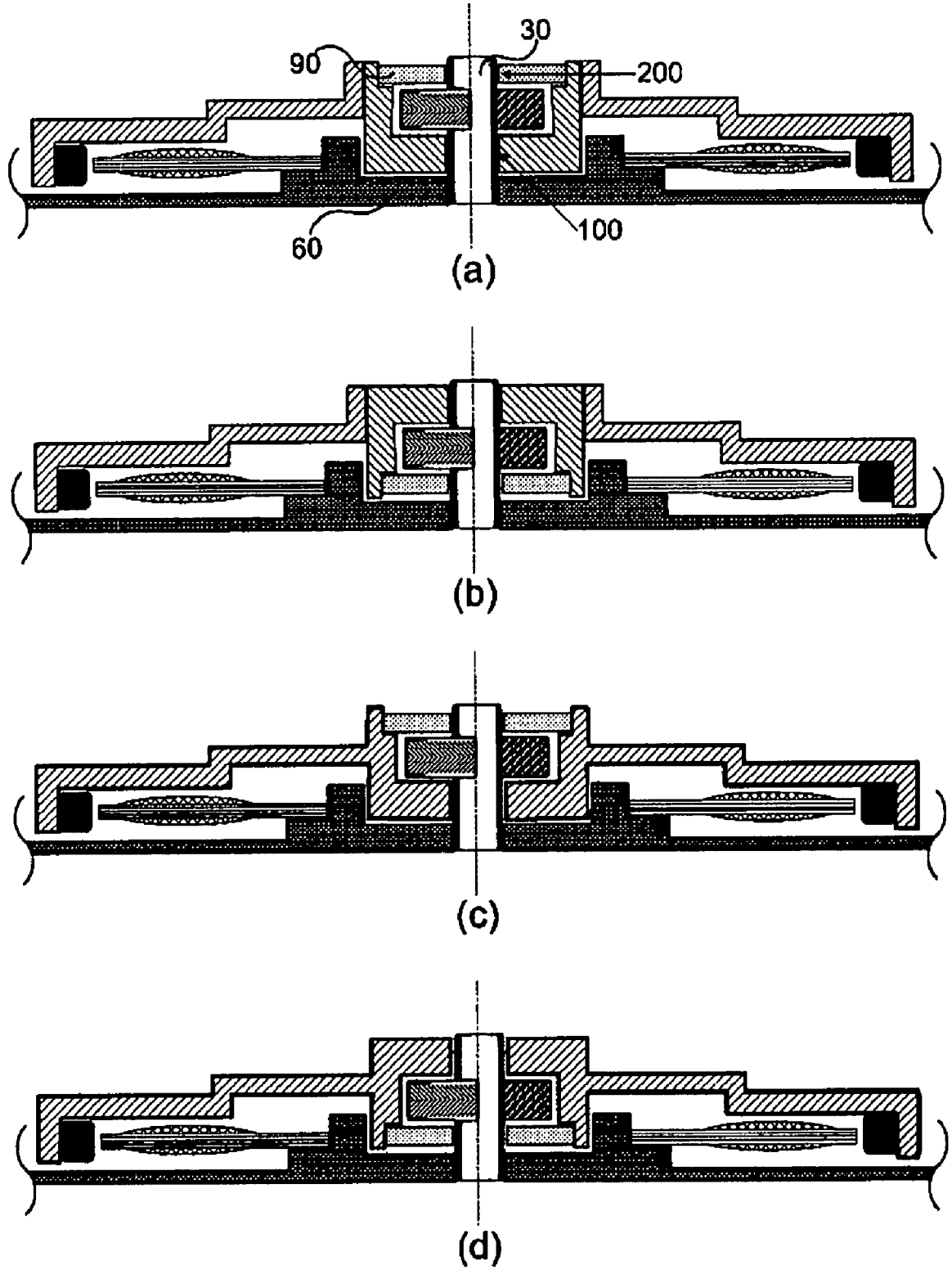
[Fig. 4]

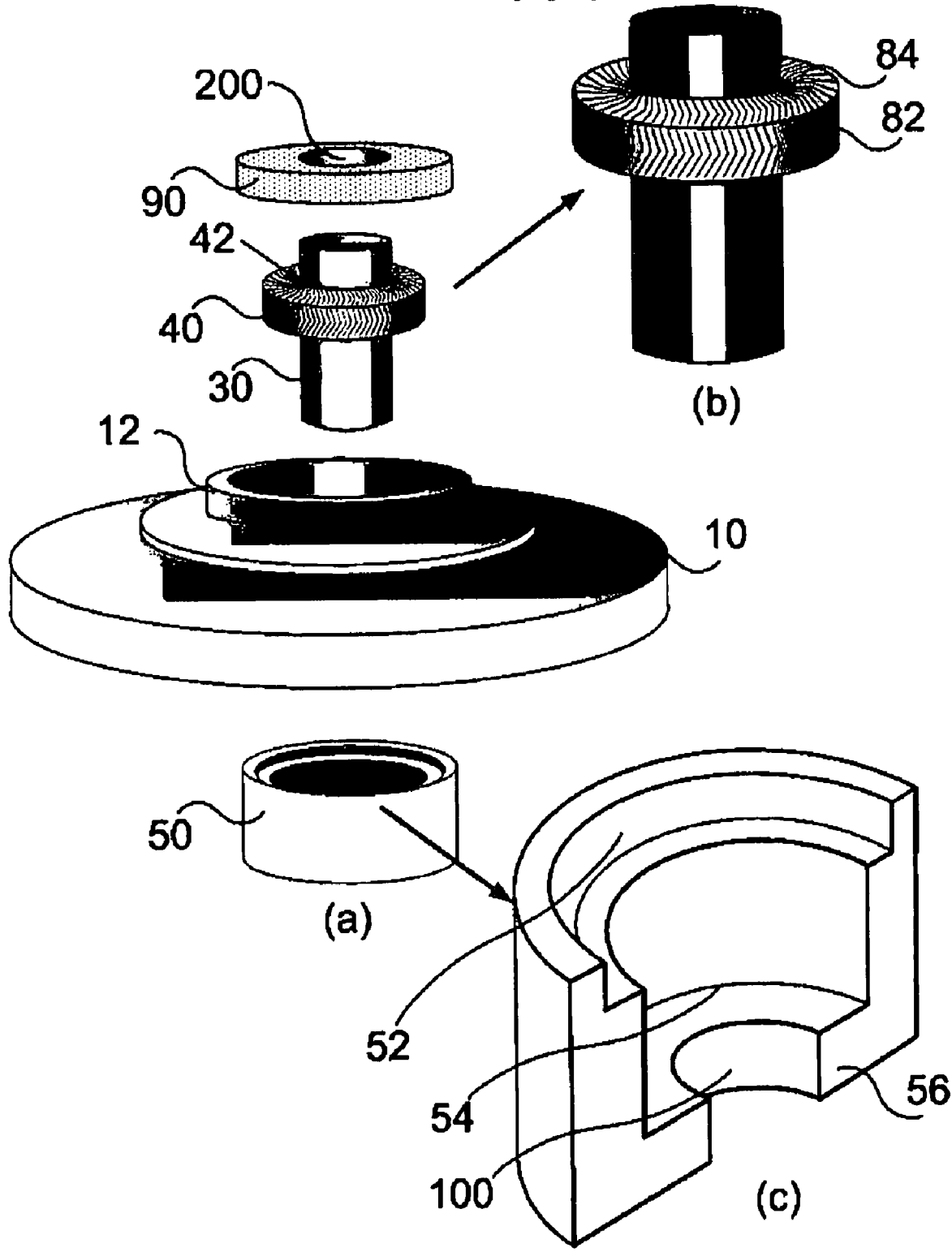
[Fig. 5]

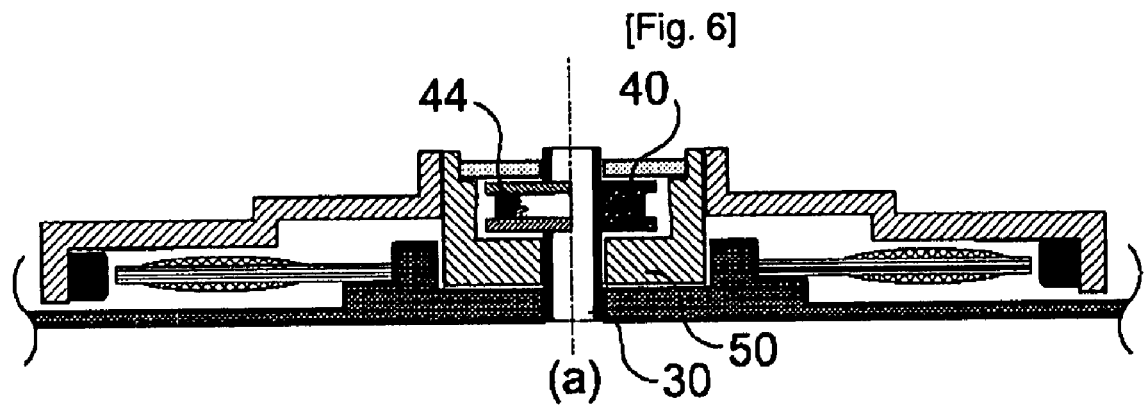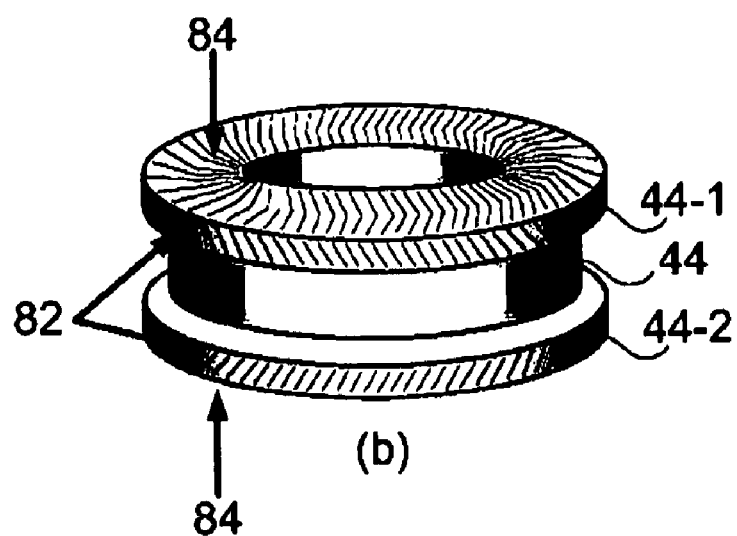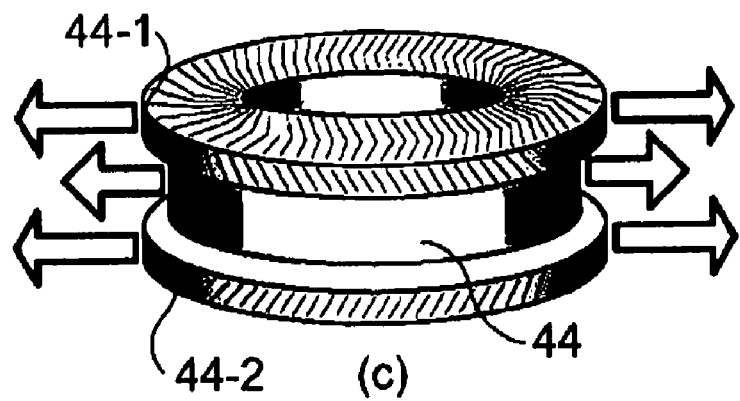
[Fig. 6]

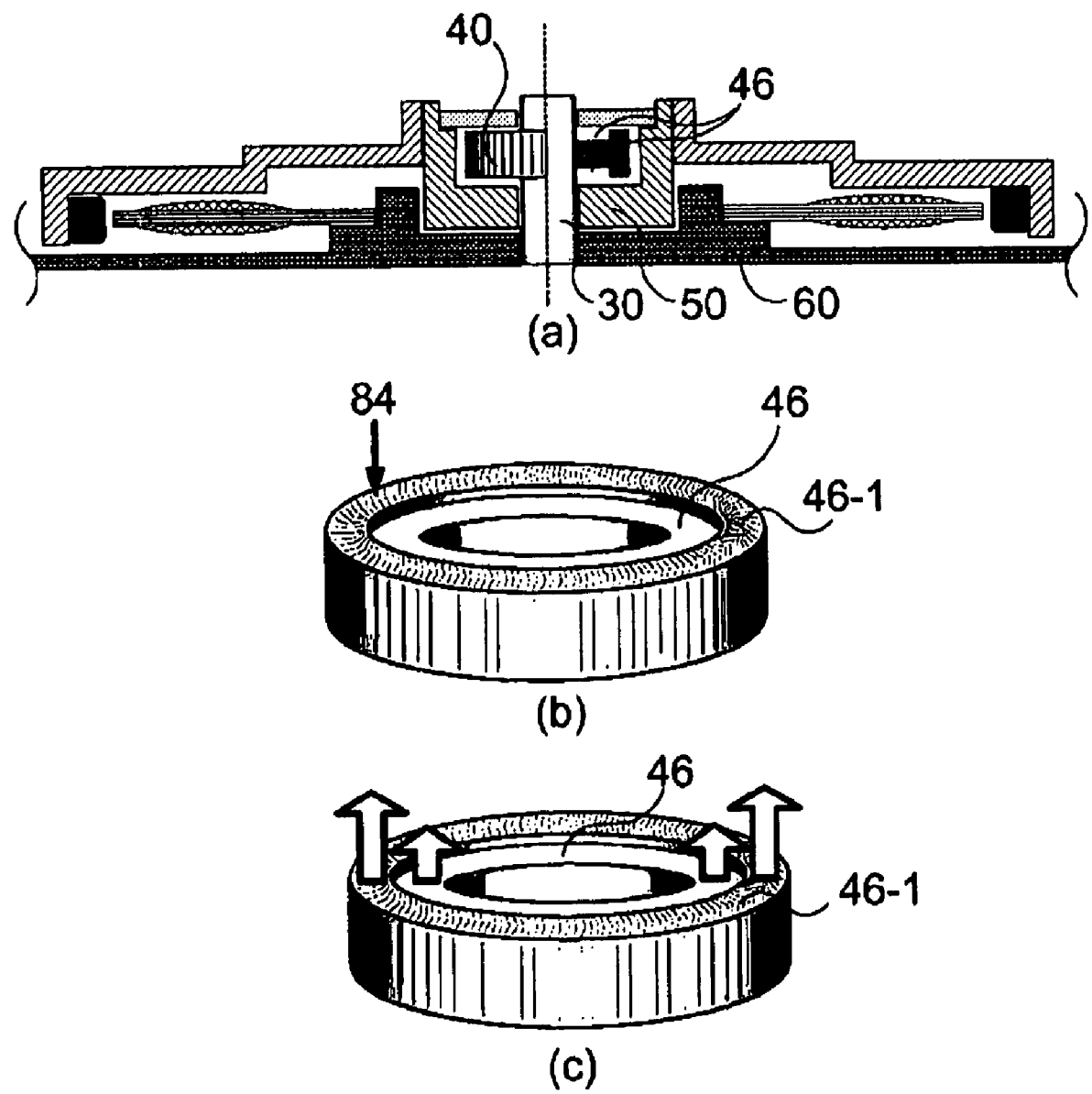

[Fig. 8]
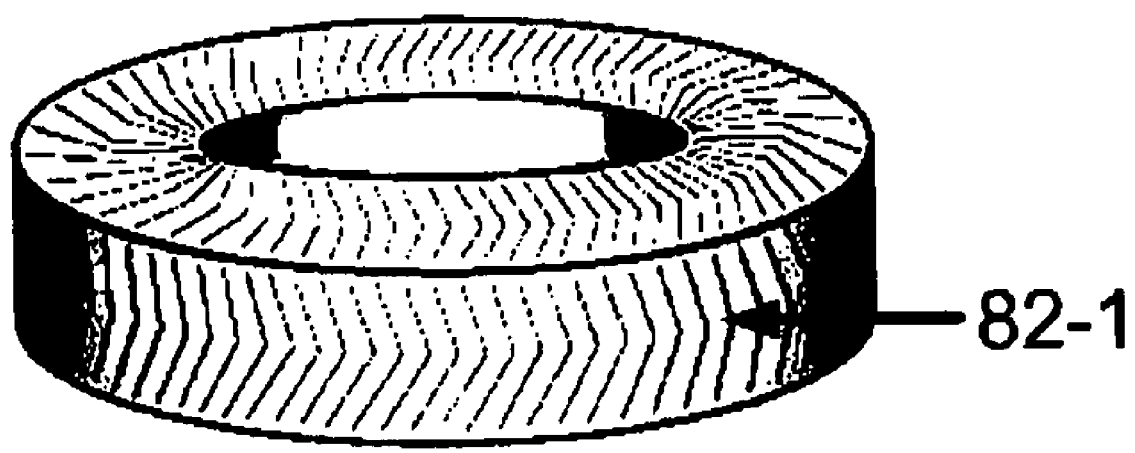
(a)
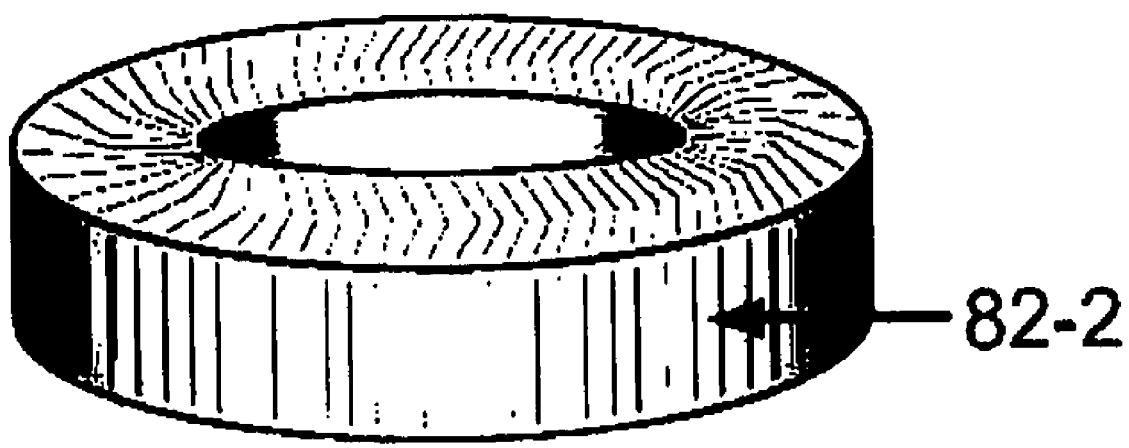
(b)

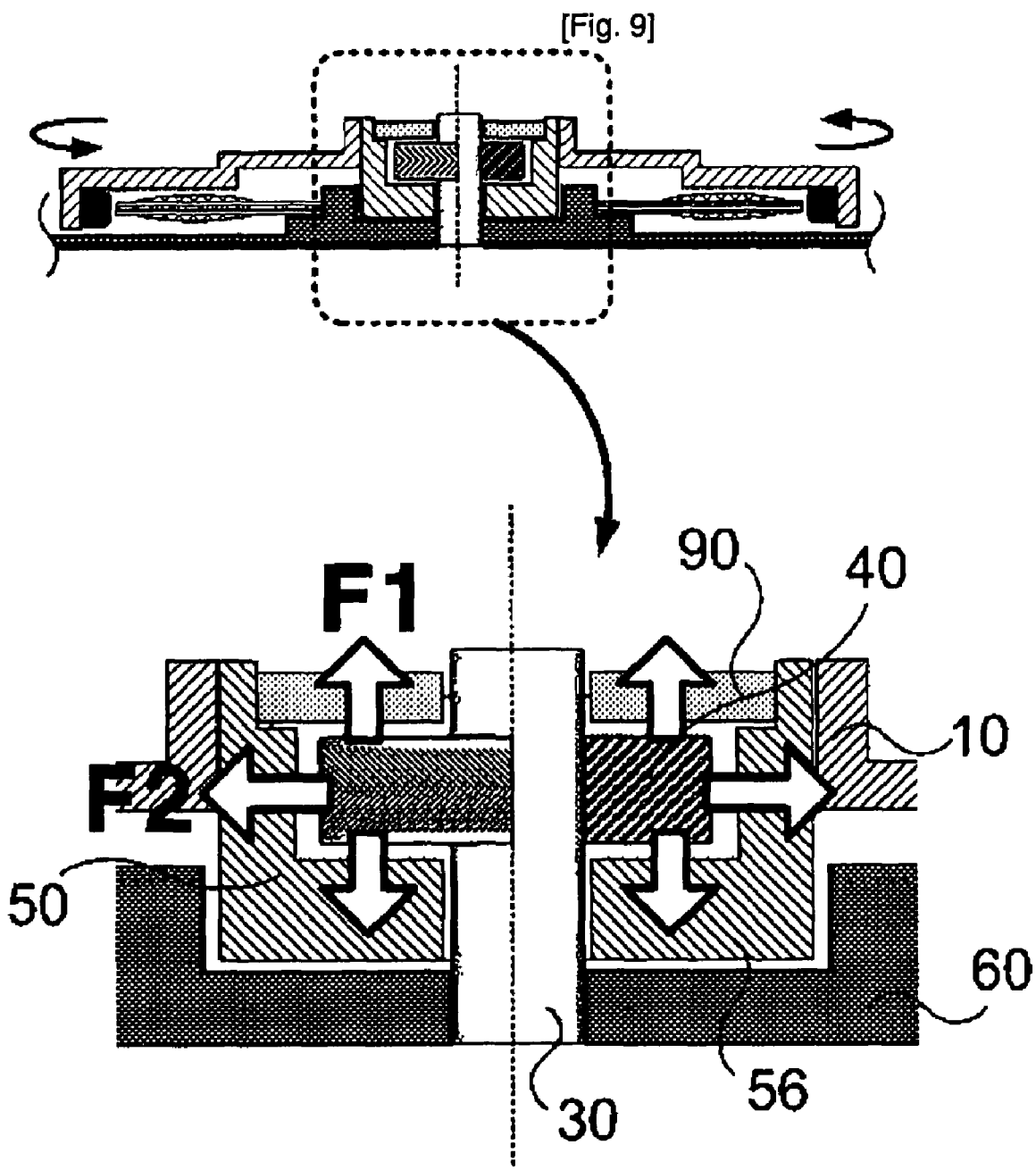

ULTRA-THIN SPINDLE MOTOR HAVING GROOVE FORMED ON THE OUTER CIRCUMFERENTIAL SURFACE OF THRUST BEARING

TECHNICAL FIELD

The present invention relates to a spindle motor providing a plurality of platters with a rotating force in a hard disc drive (hereinafter, referred to as HDD) and more particularly to the combined configuration of a shaft, a thrust bearing and a sleeve constituting the spindle motor and the structure thereof.

BACKGROUND ART

In general, the HDD is referred to as an auxiliary memory device designed to write and read data by rotating a disc-shaped aluminum plate coated with a magnetic substance thereon. Although the HDD has a disadvantage that it cannot be used replaceably with others in accordance with the need, it is widely used in small-sized computers because it is cheap and has a large storage capacity. Particularly, since a small-sized HDD is suitable to be used in personal computers, they are widely used in the field of the personal computers. As the capacity of HDD used in such personal computers, 1 GB-class HDD was basically used in the mid-1990's and 16GB-class HDD has been generalized in the late 1990's. Globally, the storage capacity are increasing 60% in every year and the cost thereof is on the decrease of 12% on a quarterly basis.

Typically, the HDD has phonorecord-shaped, overlapped platters on which concentric circles referred to as tracks are inscribed and data are electronically written into the circles. Briefly, the HDD comprises a hard disc having a plurality of platters 1 stacked thereon, a spindle motor 2, a head 3, head arm 4 and a stepping motor, as shown in FIG. 1.

The platter 1 is made by thinly coating a metal disc with a magnetic substance having magnetism. A high-capacity HDD uses several sheets of platters 1 because of the limitation in the capacity of data that can be written into one sheet of platter 1 and the size of HDD is determined depending on the platter's size and numbers.

The spindle motor 2 rotates at a given speed (for example, 3600 rpm, 5400 rpm, 7200 rpm) when a power is applied to the motor which rotates the platter, and one or more platters 1 are connected to a spindle axis of the spindle motor 2 and thus rotate simultaneously. In order to reliably read/write data, it is important to exactly control rotating rates of the spindle motor 2, among other things.

The head 3 moves horizontally above and below the rotating platter 1 and read/write data on the platter 1. The head arm 4 allows the head 3 to move and adjusts the location of the head 3 in response to receiving commands from a controller chip.

Finally, the stepping motor 5 provides motive power for moving the head 3 to the position of platter 1, and an access time (i.e. the total time taken for the HDD to allocate or transfer data to a memory) is determined depending on a good or bad condition in performance of the stepping motor 5.

Particularly, among the foregoing, the spindle motor to which the present invention applied belongs to a brushless-DC motor (BLDC motor) and rotates the platter 1 by transferring a rotating force to the center of the platter. This motor is widely used as a laser beam scanner motor for laser printer, a motor for floppy disk drive (FDD), a motor for optical disk drive such as compact disk (CD) or digital versatile disk (DVD) and the like.

In machines requiring such high capacity and high-speed driving power as the above HDD, spindle motors adopting a hydro dynamic bearing having driving load (or driving friction) less than a conventional ball bearing type are the tendency of favorite usage.

Herein, since the hydro dynamic bearing basically forms a thin hydro film between a rotator and a stator and supports the rotator by a pressure generated when rotating, the rotator and the stator are not contacted each other, resulting in a decreased friction load. Therefore, the spindle motor of the hydro dynamic bearing type is distinguished from such spindle motor of ball bearing type supporting the shaft by steel or ceramic balls in that a lubricating oil holds the shaft of the motor which rotates the disk by means of the only dynamic pressure.

Further, in case of the spindle motor of the ball bearing type, there are disadvantages that the ball bearing generates noise and vibration due to the contact of component parts, ball and race wheel and particularly the vibration acts as an obstacle factor in promoting the track density of hard disc. In contrast, in case of the hydro dynamic bearing based on a oil pressure force, there is no metal friction and the more a rotating speed is fast, the more stability is improved. Therefore, the bearing has been adopted primarily on the HDD due to less noise and vibration properties thereof.

As such, the internal structure of a conventional spindle motor of a hydro dynamic bearing type consists of a base 26, a sleeve 25, a stator core 27, a shaft 23, a hub 21 and a magnet 22 as shown in FIG. 2.

In the spindle motor, the sleeve 25 is fixedly coupled perpendicularly to the inner side of the base 26 forming an appearance, a stator core 27 having coil wound thereto is mounted on the outer of the upper side of the base 26 and the shaft is rotatably inserted to penetrate through the inner center portion of the sleeve 25. The lower portion of the shaft 23 is rotatably coupled with a disc-shaped thrust bearing 24 together with the shaft 23, the lower end thereof is sealed from the outside by a thrust cover plate, and the upper portion of he shaft 23 is coupled with a cap-shaped hub 21 having its inner opened downwardly. And, the inner side of the end portion of the hub 21 is, attached, at the position facing the stator core 27, with a magnet 22 and an clearance for oil is formed between the outer side surface of the shaft 23 and thrust bearing 24 and the sleeve 25 and filled with fluid substance such as lubricating oil, grease, etc.

Accordingly, if the hydro dynamic bearing type of spindle motor is applied with an external power, the hub 21 and the shaft 23 coupled to the hub is rotated by an electromagnetic repulsive force acting between the stator core 27 and magnet 22.

And, typically, the groove formed in the outer circumference of the shaft 23 is of a herringbone or spiral shape as shown and thus if the shaft 23 is rotated, the oil filled in the oil gap moves towards the center portion of the groove 28 and generates a hydro dynamic pressure to support the shaft 23, thereby supporting the shaft 23 and preventing a dispersion of fluid substance filled in the oil gap.

However, for the spindle motor using hydro dynamic bearing as shown in FIG. 2, the shaft 23 which is the axis of the hub 21 is not fixed, but supported by the fluid substance within the sleeve 25 and thus the shaft 23 needs a relatively large radial hydro dynamic pressure, compared to the case that the shaft 23 is fixed. Accordingly, in case that the length (L1) of the shaft 23 is shortened, it is not possible to obtain a large hydro dynamic pressure and resultantly there exists a disadvantage that it is difficult to manufacture a thin spindle motor.

Further, there is a problem that it is difficult to comply with the requirements for main properties required in the spindle motor for HDD such as a low non repeatable run out (low NRRO), low noise, high speed rotation, high intensity, low power consumption, high confidence, a small size, low dust, low cost and the like.

DISCLOSURE OF INVENTION

Technical Problem

In order to overcome the problems in the above-mentioned conventional spindle motor, an object of the present invention is to provide an ultra-thin spindle motor having a radial dynamic pressure generating groove formed on the outer circumferential surface of thrust bearing wherein the thrust bearing has a groove formed on the outer circumferential surface of the bearing without being affected by the length of shaft to thereby enable manufacturing of an ultra-thin spindle motor. The other object of the present invention is to provide, by improving the thrust bearing structure, a spindle motor having properties such as low NRRO, low noise, high speed rotation, high intensity, low power consumption, high confidence, a small size, low dust, low cost and the like.

Technical Solution

In order to achieve the above objects of the present invention as described above, an ultra-thin spindle motor having a groove formed on the outer circumferential surface of a thrust bearing which uses a hydro dynamic bearing according to the present invention is characterized by comprising: a hub 10 of a cap shape opened downwardly to mount a plurality of platters thereon, wherein a magnet 20 is installed in the inner side or outer side of vertical wall surface of the hub and a coupling portion 12 is formed on the center portion of the hub to couple a thrust bearing sleeve 50 to the center portion; the thrust bearing sleeve 50 being coupled to the coupling portion 12 of the hub 10 for coupling the hub 10 and a thrust bearing 40 wherein the thrust bearing sleeve 50 is of a cylindrical shape having a closed surface at its one side and has a first inner circumferential hole 52 to which a cover plate 90 is coupled from the opened side and a second inner circumferential hole 54 extended from the first inner circumferential hole 52 and having the thrust bearing 40 insert-mounted thereon; the cover plate 90 coupled to the first inner circumferential hole 52 of the thrust bearing sleeve 50 for shielding the thrust bearing sleeve 50 having the thrust bearing 40 mounted thereon and thus restricting the thrust bearing 40 in a vertical direction; a first through hole 100 formed on the closed surface 56 of the thrust bearing sleeve 50 or the center portion of the cover plate 90 in order to couple the shaft 30 coupled to the thrust bearing 40 to a base 60; the thrust bearing 40 being of a disc shape having a given thickness, being inserted into the second inner circumferential hole 54 of the thrust bearing sleeve 50 and having a shaft coupling hole 42 for coupling the shaft 30 formed on the center portion thereof; a radial hydro dynamic pressure generating groove 82 formed on the outer circumferential surface of the thrust bearing 40; an axial dynamic pressure generating groove 84 formed on the upper and lower surfaces of the thrust bearing 40 or the closed surface 56 of the thrust bearing sleeve 50 and an one surface of the cover plate 90; the shaft 30 being insert-fixed into the shaft coupling hole of the thrust bearing 40 and fixedly coupled vertically to the base 60 with contactlessly penetrating the first through hole 100; the base 60 couple vertically to the shaft 30 for fixedly supporting the shaft 30; and a stator core 70 having coil wound thereto and coupling the base 60 to face the magnet 20.

It is preferable that the coupling portion of the hub 10 is of a tube shape to increase a coupling area of the hub 10 and the thrust bearing sleeve 50.

Also, it is preferable that the thrust bearing sleeve 50 is integrally fabricated on the center portion of the hub 10.

Also, it is preferable that the thrust bearing sleeve 50 or the cover plate 90 further comprises a second through hole 100 formed for the shaft 30 to penetrate contactlessly it and that the shaft 30 is formed relatively long for the shaft 30 to penetrate the first through hole 100, the thrust bearing 40 and the second through hole 200, sequentially.

Also, it is preferable that the thrust bearing 40 can be formed by powder metal/sinterd metal and that the radial dynamic pressure generating groove 82 is formed using a sintering processing method.

Also, it is preferable that the thrust bearing 40 has a groove 44 of a belt shape formed, on its outer circumferential surface, at a given depth along with the outer circumferential surface.

Also, it is preferable that the thrust bearing 40 has a recess of a disk shape formed on its upper and lower surfaces at a given depth.

Also, it is preferable that the thrust bearing 40 has a groove 44 of a belt shape formed, on its outer circumferential surface, at a given depth along with the outer circumferential surface, and a recess of a disk shape formed on its upper and lower surfaces at a given depth.

Also, it is preferable that the radial dynamic pressure generating groove 82 is formed on the outer circumferential surface of the thrust bearing using a sintering processing method.

Also, it is preferable that the radial dynamic pressure generating groove 82 is of a herringbone shape or a vertical lattice shape.

Hereinafter, an ultra-thin spindle motor according to the present invention in which a groove is formed on an outer circumferential surface of a thrust bearing will be described in detail in conjunction with the accompanying drawings.

DESCRIPTION OF DRAWINGS

FIG. 1 illustrates schematically a conventional structure of hard disc drive (HDD);

FIG. 2 illustrates a conceptual structure of a spindle motor for a conventional HDD;

FIG. 3 illustrates a conceptual structure of an ultra-thin spindle motor according to the present invention;

FIG. 4 illustrates a structure further comprising a second through hole in the ultra-thin spindle motor according to the present invention;

FIG. 5 illustrates the structure of constitutional elements according to the present invention and the coupled shape thereof;

FIG. 6 illustrates a structure of a thrust bearing in an ultra-thin spindle motor according to the present invention;

FIG. 7 illustrates a structure of a thrust bearing in an ultra-thin spindle motor according to the present invention;

FIG. 8 illustrates a radial dynamic pressure generating groove formed on the outer circumferential surface of a thrust bearing in an ultra-thin spindle motor according to the present invention; and FIG. 9 illustrates a dynamic pressure generating in an ultra-thin spindle motor according to the present invention.

BEST MODE

FIG. 3 illustrates a conceptual structure of a ultra-thin spindle motor according to the present invention in which the groove is formed on an outer circumferential surface of a thrust bearing. FIG. 3a is a view which a closed surface 56 of a thrust bearing sleeve 50 faces a base 60 and FIG. 3b is a view which the closed surface 56 of a thrust bearing sleeve 50 towards a hub 10.

Also, FIG. 3c is a view which a hub 10 and a thrust bearing sleeve 50 are integrally fabricated in the structure of FIG. 3a, FIG. 3d is a view which a hub 10 and a thrust bearing sleeve 50 are integrally fabricated in the structure of FIG. 3b.

Now, the present invention will be described in conjunction with respective Figures.

As shown in FIG. 3a, the present invention comprises a hub 10 having a magnet 20 installed therein and a coupling portion 12; a thrust bearing sleeve 50 having a first outer circumferential hole 52 and a second outer circumferential hole 54 extended from the first outer circumferential hole 52, as shown from the opened side of a cylindrical shape having a closed surface 56 at its one side; a closed cover plate; a first through hole 52; a thrust bearing having a shaft coupling hole formed thereon; a radical dynamic pressure generating groove 84; a shaft 30, a base; and a stator.

More specifically, the hub 10 has, at its center, a coupling portion 12 into which a thrust bearing sleeve 50 can be installed.

At this time, the inner diameter of the coupling portion is configured to be substantially equal to the outer diameter of thrust bearing sleeve 50 so that the thrust bearing sleeve 50 can be forcedly coupled thereinto. The shape of the coupling portion 12 may be an inserting hole or an inserting tube. Alternatively, the above shape is preferred to be a tubular type having a predetermined length and being protruded from the outer side of the hub 10 as shown in the above Figure so as to ensure a coupling length for a erectness and a coupling force.

The thrust bearing sleeve 50 for connecting the hub 10 and the thrust bearing 40 fixedly coupled to the shaft 30 has a closed surface at its one side and an opened cylindrical shape at its other side. The thrust bearing sleeve 50 is formed succeedingly with a first inner circumferential hole 52 that is an inner space having an inner diameter to which a cover plate 90 from the opened side is coupled and a second inner circumferential hole 54 that is an inner space having an inner diameter into which the first inner circumferential hole 52 and the thrust bearing 40 may be inserted contactlessly. Further, as shown in the above Figure, in case that the hub 10 and the thrust bearing sleeve 50 are coupled, a first through hole 100 being passed through contactlessly by a shaft 30 is located on the center of the closed surface of the thrust bearing sleeve 50.

The cover plate 90 is a circular plate shape and insert-coupled into the first inner circumferential hole of the thrust bearing sleeve 50. The resultantly coupled cover plate 90 shields the thrust bearing sleeve 50 as well as vertically restrains the thrust bearing 40 mounted on the thrust bearing sleeve 50.

The thrust bearing 30 is a circular plate shape having a predetermined thickness and formed with a shaft coupling hole for coupling it with the shaft in the center. As such, the thrust bearing 40 is placed on the second inner circumferential hole 54 of the thrust bearing sleeve 50 with a given clearance therebetween. As the most significant feature, a groove is formed to generate a dynamic pressure on the outer circumferential surface of the thrust bearing. The thrust bearing 40 is preferably manufactured by a sintering method or a metal injecting molding method using a metal powder.

Also, the radial dynamic pressure generating groove 82 is preferably formed on the outer circumferential surface of the thrust bearing 40 by a sintering method using a rolling or pressing.

Therefore, by mixing and pressing the powder metal at a predetermined rate and then forming it in a certain shape with increasing temperature, a vesicle is produced, resulting in its density lower than the raw material. If the resultantly manufactured thrust bearing 40 is formed with a groove by means of a mold or tool, the vesicle is compressed and thus its shape resembles that of the mold and thus it is possible to reduce the protrusion of the circumference. That is, it is possible to form it precisely because of its good transferring characteristic.

The shaft 30 is coupled to the shaft coupling hole 42 of the thrust bearing and passes through the first through hole 100 and thus fixedly coupled to the base 60. The above Figure shows a structure in which the first through hole 100 is installed on the closed surface 56 of the thrust bearing sleeve 50, wherein the shaft 30 is contactlessly coupled to the base 60 with passing through the first through hole 52. The coupling of the shaft 30 and the thrust bearing 40 may be made by means of such methods as force inserting, bonding, welding, etc. or formed integrally.

The base 60 serves as a supporting plate in accordance with driving of the spindle motor, and constitutional elements of the spindle motor are coupled and driven based on the base 60. That is, a stator core 70 having a coil wound about the base 60 is coupled to the opposite position to the magnet coupled to the inner side of the hub 10 and the shaft is also fixedly coupled to the base 60. Therefore, the thrust bearing 40 coupled to the thrust bearing is also fixed. The base 60 is manufactured by means of aluminum die cast, plastics, metal press product, etc. and the coupling of the base 60 and the shaft 30 is made by means of force inserting, heat shrink, press fit, bonding, etc.

Consequently, as in the foregoing, the base 60 is fixed with the stator core 70, the shaft and the thrust bearing 40, and the hub, the thrust bearing sleeve 50 and the cover plate 90 is coupled thereto to thereby allowing the hub 10 to be rotated.

Accordingly, the constitutional elements are coupled as shown in the above Figure and thus when the stator core 70 is applied with a power supply, the hub 10 is rotated by a repulsive force occurring between the magnet 20 coupled to the hub 10 and the stator core 70. Therefore, the thrust bearing sleeve coupled to the hub is rotated, and the cover plate 90 coupled to the thrust bearing sleeve 50 is also rotated.

At this time, the hub 10 which rotates with being having a thrust bearing sleeve coupled thereto is supported horizontally and vertically by means of the hydro pressure generated by a radial hydro dynamic pressure generating groove 82 formed on the outer circumferential sleeve of the thrust bearing as well as a axial hydro dynamic pressure generating groove (not shown) formed on an one side of the cover plate 90 facing the upper/lower surfaces of the thrust bearing 40 or the cover plate 90 facing the thrust bearing 40 and the thrust bearing sleeve 50.

FIG. 3b shows other view that the thrust bearing sleeve 50 is coupled to the hub 10. As shown in FIG. 3b, as further embodiment of the present invention, the closed surface of the thrust bearing sleeve 50 is upwardly coupled to the coupling portion 12 of the hub 10. That is, the position of the cover plate 90 is opposite to that in FIG. 3a and thus the first through hole 100 is also installed in the center of the cover plate 90.

FIGS. 3c and 3d show a view that the hub 10 and the thrust bearing sleeve 50 are fabricated integrally. FIG. 3c shows that the hub 10 and the thrust bearing sleeve 50 in FIG. 3a are fabricated integrally wherein the opened side of the thrust bearing sleeve 50 towards the outer side of the hub 10 and thus the cover plate 90 is coupled to the outer side of the hub 10.

FIG. 3d shows that the hub 10 and the thrust bearing sleeve 50 in FIG. 3b are fabricated integrally wherein the opened side of the thrust bearing sleeve 50 towards the inner side of the hub 10 and thus the cover plate 90 is coupled to the inner side of the hub 10.

FIG. 4 illustrates a structure further comprising a second through hole in the ultra-thin spindle motor according to the present invention. As shown in FIG. 4, the second through hole is formed on the thrust bearing sleeve 50 or the cover plate 90 and the shaft 30 is formed long so that the second through hole 200 can be passed through contactlessly. That is, the shaft 30 coupled to the base 60 is passed through the first through hole 100, the thrust bearing 40 and the second through hole 200, sequentially. At this time, the first though hole 100 and the second through hole 200 are formed at least larger than the shaft 30 in diameter and thus the shaft 30 can pass through the first though hole 100 and the second through hole 200, contactlessly.

Regarding the structure shown in FIG. 4a, the second through hole 200 is formed on the center of the cover plate 90. Therefore, the shaft 30 is coupled to the 40 wherein the one side of the shaft 30 passes through the 100 to be coupled to the base 60 and other side thereof passes through the 200. As a result, this structure reduces the possibility that the thrust bearing sleeve 50 may be warped. That is, the possibility of variation in the horizontal condition of the hub 10 under the external impact or other situations can be reduced in comparison with the case that there is only the first through hole 100, thereby promoting leveling the hub 10.

FIGS. 4a, 4b, 4c and 4d show that the second through hole 200 is further formed in FIGS. 3a to 3d.

FIGS. 5 and 6 illustrate the structure of constitutional elements and the coupled shape thereof in the spindle motor according to the present invention as shown in FIG. 4a.

FIG. 5 illustrates the structure of constitutional elements according to the present invention and the coupled shape thereof in which FIG. 5a shows a cover plate 90, the thrust bearing 40, the shaft 30, the hub 10 and the thrust bearing sleeve, sequentially, FIG. 5b shows a enlarged view of the coupled structure of the shaft 30 and the thrust bearing 40, and FIG. 5c shows a sectional view of the thrust bearing sleeve 50.

As shown in FIG. 5a, the cover plate 90 is formed with a second through hole 200 which has a circular plate shape and the center thereof passed through by the shaft. The thrust bearing 40 and the shaft 30 which correspond to a rotational axis are fixedly coupled in such a manner that the shaft 30 is inserted into the shaft coupling hole 42 formed on the thrust bearing 40.

FIG. 3b shows other view that the thrust bearing sleeve 50 is coupled to the hub 10. As shown in FIG. 3b, as further embodiment of the present invention, the closed surface of the thrust bearing sleeve 50 is upwardly coupled to the coupling portion 12 of the hub 10. That is, the position of the cover plate 90 is opposite to that in FIG. 3a and thus the first through hole 100 is also installed in the center of the cover plate 90.

FIGS. 3c and 3d show a view that the hub 10 and the thrust bearing sleeve 50 are fabricated integrally. FIG. 3c shows that the hub 10 and the thrust bearing sleeve 50 in FIG. 3a are fabricated integrally wherein the opened side of the thrust bearing sleeve 50 towards the outer side of the hub 10 and thus the cover plate 90 is coupled to the outer side of the hub 10.

FIG. 3d shows that the hub 10 and the thrust bearing sleeve 50 in FIG. 3b are fabricated integrally wherein the opened side of the thrust bearing sleeve 50 towards the inner side of the hub 10 and thus the cover plate 90 is coupled to the inner side of the hub 10.

FIG. 4 illustrates a structure further comprising a second through hole in the ultra-thin spindle motor according to the present invention. As shown in FIG. 4, the second through hole is formed on the thrust bearing sleeve 50 or the cover plate 90 and the shaft 30 is formed long so that the second through hole 200 can be passed through contactlessly. That is, the shaft 30 coupled to the base 60 is passed through the first through hole 100, the thrust bearing 40 and the second through hole 200, sequentially. At this time, the first though hole 100 and the second through hole 200 are formed at least larger than the shaft 30 in diameter and thus the shaft 30 can pass through the first though hole 100 and the second through hole 200, contactlessly.

Regarding the structure shown in FIG. 4a, the second through hole 200 is formed on the center of the cover plate 90. Therefore, the shaft 30 is coupled to the 40 wherein the one side of the shaft 30 passes through the 100 to be coupled to the base 60 and the other side thereof passes through the 200. As a result, this structure reduces the possibility that the 50 may be warped. That is, the possibility of variation in the horizontal condition of the hub 10 under the external impact or other situations can be reduced in comparison with the case that there is only the first through hole 100, thereby promoting leveling the hub 10.

FIGS. 4a, 4b, 4c and 4d show that the second through hole 200 is further formed in FIGS. 3a to 3d.

FIGS. 5 and 6 illustrate the structure of constitutional elements and the coupled shape thereof in the spindle motor according to the present invention as shown in FIG. 4a.

FIG. 5 illustrates the structure of constitutional elements according to the present invention and the coupled shape thereof in which FIG. 5a shows a cover plate 90, the thrust bearing 40, the shaft 30, the hub 10 and the thrust bearing sleeve, sequentially, FIG. 5b shows a enlarged view of the coupled structure of the shaft 30 and the thrust bearing 40, and FIG. 5c shows a sectional view of the thrust bearing sleeve 50.

As shown in FIG. 5a, the cover plate 90 is formed with a second through hole 200 which has a circular plate shape and the center thereof passed through by the shaft. The thrust bearing 40 and the shaft 30 which correspond to a rotational axis are fixedly coupled in such a manner that the shaft 30 is inserted into the shaft coupling hole 42 formed on the thrust bearing 40.

As shown in FIG. 5b, a radial dynamic pressure generating groove 82 is formed on the outer circumferential surface of the thrust bearing 40 and a radial dynamic pressure generating groove 84 is formed on the upper/lower surfaces thereof. Now, the structure of the thrust bearing and the shape of the groove in FIGS. 6 to 8 will be described in detail.

The thrust bearing 10 is formed on the tubular coupling portion 12 and coupled to the sleeve 50. The reason that the coupling portion 12 has a tube shape is to increase the coupling area with the thrust bearing sleeve 50 to thereby improve the coupling force.

The thrust bearing sleeve 50 fixedly coupled to the coupling portion 12 of the thrust bearing 10 as shown in FIG. 5c has a cylindrical shape that is closed at its one side by a closed surface 56 and is opened at its other side. The thrust bearing sleeve 50 is formed succeedingly with a first inner circumferential hole 52 having the cover plate 90 coupled thereto from the opened side and a second inner circumferential hole 54 having the thrust bearing 40 mounted thereon. At this time, it is preferable that the inner diameter of the second inner circumferential hole 54 should be small relatively rather than the first inner circumferential hole 52. At this time, the first through hole 100 is formed on the center portion of the closed surface 56.

Therefore, the thrust bearing sleeve 50 is fixedly coupled to the hub 10 and the shaft 30 coupled to the thrust bearing 40 is coupled thereto. Accordingly, the thrust bearing 40 is mounted on the thrust bearing sleeve 50 and thereafter the cover plate 90 is coupled to the thrust bearing 50 to thereby shield the opened surface. At this time, the shaft 30 passes through the second through hole 200 formed on the cover plate 90.

FIG. 6 illustrates a structure of a thrust bearing in an ultra-thin spindle motor according to the present invention. FIG. 6a shows a structure of a spindle motor according to the present invention comprising the thrust bearing 40 which has a groove 44 of a belt shape formed, on its outer circumferential surface, at a given depth along with the outer circumferential surface, FIG. 6b shows a specific view of the above thrust bearing 40 and FIG. 6c shows a radial dynamic pressure generated by the thrust bearing 40.

As described in FIG. 5, the thrust bearing 40 and the shaft 30 serve as rotating axis of the rotating hub 10 and thrust bearing sleeve 50. Accordingly, they are supported by oil filled between the inner surface of the thrust bearing sleeve 50 and the outer surface thereof. At this time, the thrust bearing 40 causes a loss of torque due to a fraction with oil filled in the thrust bearing sleeve 50.

Accordingly, as shown in FIG. 6a, a belt-shaped groove 44 is formed which is mounted within the thrust bearing sleeve 50 and has a given depth and width of the thrust bearing 40 fixedly coupled to the shaft 30 fixed to the base 60 based on the center of the outer circumferential surface thereof. That is, the loss of torque due to the fraction with oil can be reduced by making small the portion where the acting of dynamic pressure by oil filled in the thrust bearing sleeve 50 is largely effected.

Specifically, as shown in FIG. 6b, the belt-shaped groove 44 is formed in the outer circumferential surface of the thrust bearing 40 and thus the outer circumferential surface is formed with two protruding surfaces 44-1 and 44-2 relatively and the radial dynamic pressure generation groove 82 is formed.

Accordingly, in the thrust bearing 40 having the above groove 44 formed thereon, when the thrust bearing sleeve 50 rotates, a relatively large dynamic pressure is generated in the protruding surfaces 44-1, 44-2 as shown in FIG. 6c, while a relatively small dynamic pressure is generate in the surface formed by the groove 44. That is, a radial dynamic pressure on the upper and lower sides of the thrust bearing 40 occurs and thus the thrust bearing sleeve 50 is supported more stably in the radial direction and at the same time the area where the dynamic pressure caused by a fraction with oil is reduced, resulting in the reduced loss of torque due to the fraction.

FIG. 7 illustrates a structure of a thrust bearing in an ultra-thin spindle motor according to the present invention. FIG. 7a shows a structure of a spindle motor according to the present invention comprising a thrust bearing 40 having a disc-shaped hole 46 formed on the upper and lower surfaces thereof, FIG. 7b shows a specific view of the above thrust bearing 40 and FIG. 7c shows an axial dynamic pressure generated by the thrust bearing 40.

As described in FIG. 5, the thrust bearing 40 and the shaft 30 serve as rotating axis of the rotating hub 10 and thrust bearing sleeve 50. Accordingly, they are supported by oil filled between the inner surface of the thrust bearing sleeve 50 and the outer surface thereof. At this time, the thrust bearing 40 causes a loss of torque due to a fraction with oil filled in the thrust bearing sleeve 50.

Accordingly, as shown in FIG. 7a, a disc-shaped hole 46 is formed which is mounted within the thrust bearing sleeve 50 and has a given depth and width of the thrust bearing 40 fixedly coupled to the shaft 30 fixed to the base 60 based on the upper and lower surfaces and the center thereof. That is, the loss of torque due to the fraction with oil can be reduced by making small the portion where the acting of dynamic pressure by oil filled in the thrust bearing sleeve 50 is largely effected.

Specifically, as shown in FIG. 7b, the disc-shaped hole 46 is formed in the upper and lower surfaces of the thrust bearing 40 and thus the upper and lower surfaces are formed with a protruding surface 46-1 relatively and the axial dynamic pressure generation groove 84 is formed.

Accordingly, in the thrust bearing 40 having the above hole 46 formed thereon, when the thrust bearing sleeve 50 rotates, a relatively large dynamic pressure is generated in the protruding surfaces 46-1 as shown in FIG. 7c, while a relatively small dynamic pressure is generate in the surface formed by the hole 46. That is, an axial dynamic pressure on the outer sides of the upper and lower sides of the thrust bearing 40 occurs and thus the thrust bearing sleeve 50 is supported more stably in the axial direction and at the same time the area where the dynamic pressure caused by a fraction with oil is reduced, resulting in the reduced loss of torque due to the fraction.

Although different structures of the thrust bearing are illustrated in FIGS. 6 and 7, the trust bearing may include both a belt-shaped groove 44 and a disc-shaped hole 46 therein.

FIG. 8 illustrates a radial dynamic pressure generating groove formed on the outer circumferential surface of a thrust bearing in an ultra-thin spindle motor according to the present invention. FIG. 8a shows a view which a radial dynamic pressure generating groove 82-1 formed on the outer circumferential surface of the thrust bearing is of a herringbone shape and FIG. 8b shows a view which a radial dynamic pressure generating groove 82-2 formed on the outer circumferential surface of the thrust bearing is of a vertical lattice shape.

The radial dynamic pressure generating groove 82-1 as shown in FIG. 8a, allows a flow of fluid for preventing dispersion of oil and generating a large dynamic pressure to be concentrated on the center of the thrust bearing, thereby preventing dispersion of oil and generating a radial dynamic pressure.

The radial dynamic pressure generating groove 82-2 of vertical lattice type as shown in FIG. 8b is focused to a dynamic pressure rather than the prevention of dispersion of oil and thus generates a relatively large dynamic pressure by forming a groove in a vertical lattice form formed axially. That is, by making the flowing speed of oil relatively large, the radial dynamic pressure proportional to the square of the flowing speed of fluid is formed relatively large.

FIG. 9 illustrates a dynamic pressure generating in the ultra-thin spindle motor according to the present invention. As shown in FIG. 9, the spindle motor according to the present invention rotates the hub 10 and the thrust bearing sleeve 50 about a rotating axis which is formed of the fixed shaft 30 fixedly coupled to the base 60 and the thrust bearing 40 coupled to the shaft 30. At this time, a radial dynamic pressure F1 is generated by a radial dynamic pressure generating sleeve formed on the outer circumferential surface of the thrust bearing 40, while an axial dynamic pressure F2 is generated by an axial dynamic pressure generating sleeve formed on the upper and lower surfaces of the thrust bearing 40.

The above generated dynamic pressures F1 and F2 support horizontally and vertically a rotating thrust bearing 50, thereby supporting the hub 10 coupled to the thrust bearing 50.

That is, in the structure as shown, the radial dynamic pressure F1 acts between the outer circumferential surface of the thrust bearing 40 and the vertical wall surface of the thrust bearing sleeve 50 to thereby support the thrust bearing sleeve 50 horizontally, while the axial dynamic pressure F2 acts between the upper surface of the thrust bearing 40 and the lower surface of the cover plate 90 and between the lower surface of the thrust bearing 40 and the inner surface of a closed surface of the cover plate 90 to thereby support the thrust bearing sleeve 50 vertically.

INDUSTRIAL APPLICABILITY

As described above, the ultra-thin spindle motor having a groove formed on the outer diameter of a thrust bearing which uses a hydro dynamic bearing according to the present invention has a structure doing not need a sleeve to support the shaft, and fabricates a groove on the outer circumferential surface of the thrust bearing to thereby overcome structural thickness in manufacturing the spindle motor, compared to conventional spindle motors having a structural problems that need a sleeve to support the shaft by generating a radial dynamic pressure and have a limitation in shortening the length of shaft to form a radial dynamic pressure generating groove.

Further, the present invention can comply with the requirements for main properties required in the spindle motor for HDD such as a low non repeatable run out (low NRRO), low noise, high speed rotation, high intensity, low power consumption, high confidence, a small size, low dust, low cost and the like.

Still further, the present invention can contribute to miniaturize the size of applicable products using a spindle motor.

Although specific embodiments of the present invention have been shown and described in detail, it would be appreciated by those skilled in the art that various changes and modification may be made in this embodiment without departing from the technical spirit and scope of the invention and it is obvious that such changes and modification are within the claims attached hereto.

The invention claimed is:

1. An ultra-thin spindle motor having a groove formed on the outer circumferential surface of a thrust bearing which uses a hydro dynamic bearing, comprising: a hub (10) of a cap shape opened downwardly to mount a plurality of platters thereon, wherein a magnet (20) is installed in the inner side or outer side of vertical wall surface of the hub and a coupling portion (12) is formed on the center portion of the hub to couple a thrust bearing sleeve (50) to the center portion; the thrust bearing sleeve (50) being coupled to the coupling portion (12) of the hub (10) for coupling the hub (10) and a thrust bearing (40) wherein the thrust bearing sleeve (50) is of a cylindrical shape having a closed surface at one side thereof and has a first inner circumferential hole (52) to which a cover plate (90) is coupled from the opened side and a second inner circumferential hole (54) extended from the first inner circumferential hole (52) and having the thrust bearing (40) insert-mounted thereon; the cover plate (90) coupled to the first inner circumferential hole (52) of the thrust bearing sleeve (50) for shielding the thrust bearing sleeve (50) having the thrust bearing (40) mounted thereon and thus restricting the thrust bearing (40) in a vertical direction; a first through hole (100) formed on the closed surface (56) of the thrust bearing sleeve (50) or the center portion of the cover plate (90) in order to couple the shaft (30) coupled to the thrust bearing (40) to a base (60); the thrust beating (40) being of a disc shape having a given thickness, being inserted into the second inner circumferential hole (54) of the thrust bearing sleeve (50) and having a shaft coupling hole (42) for coupling the shaft (30) formed on the center portion thereof, a radial hydro dynamic pressure generating groove (82) formed on the outer circumferential surface of the thrust bearing (40); an axial dynamic pressure generating groove (84) formed on the upper and lower surfaces of the thrust bearing (40) or the closed surface (56) of the thrust bearing sleeve (50) and an one surface of the cover plate (90); the shaft (30) being insert-fixed into the shaft coupling hole of the thrust bearing (40) and fixedly coupled vertically to the base (60) with contactlessly penetrating the first through hole (100); the base (60) couple vertically to the shaft (30) for fixedly supporting the shaft (30); and a stator core (70) having coil wound thereto and coupling the base (60) to face the magnet (20).

2. The ultra-thin spindle motor according to claim 1, wherein the coupling portion of the hub (10) is of a tube shape to increase a coupling area of the hub (10) and the thrust bearing sleeve (50).

3. The ultra-thin spindle motor according to claim 1, wherein the thrust bearing sleeve (50) is integrally fabricated on the center portion of the hub (10).

4. The ultra-thin spindle motor according to claim 1, wherein the thrust bearing sleeve (50) or the cover plate (90) further comprises a second through hole (100) formed for the shaft (30) to penetrate contactlessly it, and the shaft (30) is formed relatively long for the shaft (30) to penetrate the first through hole (100), the thrust bearing (40) and the second through hole (200), sequentially.

5. The ultra-thin spindle motor according to claim 1, wherein the thrust bearing (40) is formed of a metal powder.

6. The ultra-thin spindle motor according to claim 1, wherein the thrust bearing (40) has a groove (44) of a belt shape formed, on outer circumferential surface thereof, at a given depth along with the outer circumferential surface.

7. The ultra-thin spindle motor according to claim 1, wherein the thrust bearing (40) has a recess of a disk shape formed on upper and lower surfaces thereof at a given depth.

8. The ultra-thin spindle motor according to claim 1, wherein the thrust beating (40) has a groove (44) of a belt shape formed, on outer circumferential surface thereof, at a given depth along with the outer circumferential surface, and a recess of a disk shape formed on upper and lower surfaces thereof at a given depth.

9. The ultra-thin spindle motor according to claim 1, wherein the radial dynamic pressure generating groove (82) is formed on the outer circumferential surface of the thrust bearing using a sintering processing method.

10. The ultra-thin spindle motor according to claim 1, wherein the radial dynamic pressure generating groove (82) is of a herringbone shape or a vertical lattice shape.

* * * * *